United States Patent [19]

Ziegler et al.

[11] 4,355,845
[45] Oct. 26, 1982

[54] ROOF FOR VEHICLES, ESPECIALLY MOTOR VEHICLES, FOR AGRICULTURAL PURPOSES

[75] Inventors: Hermann Ziegler, Renningen; Eugen Kolb, Stuttgart, both of Fed. Rep. of Germany

[73] Assignee: Dr. Ing. h.c.F. Porsche Aktiengesellschaft, Stuttgart, Fed. Rep. of Germany

[21] Appl. No.: 139,547

[22] Filed: Apr. 11, 1980

[30] Foreign Application Priority Data

Apr. 20, 1979 [DE] Fed. Rep. of Germany ....... 2916013

[51] Int. Cl.³ .............................................. B60J 7/00
[52] U.S. Cl. .................................... 296/210; 296/213; 296/218
[58] Field of Search ............... 296/190, 210, 213, 216, 296/218, 100

[56] References Cited

U.S. PATENT DOCUMENTS 3,508,787 4/1970 Strong ................................. 296/100
3,536,352 10/1970 Beckley .............................. 296/100
4,083,596 4/1978 Robertson ........................... 296/100
4,094,545 6/1978 Kramer ............................... 296/190

Primary Examiner—Joseph F. Peters, Jr.
Assistant Examiner—John A. Carroll
Attorney, Agent, or Firm—Craig and Antonelli

[57] ABSTRACT

A roof assembly for vehicles, especially motor vehicles for agricultural purposes, utilizing a roof member having approximately the shape of an inverted trough that is mounted upon a roof frame. The roof is made of plastic, is releasably mounted to the vehicle, and has a segment which rests upon the roof with a sealing element interposed therebetween. This segment cooperates with a supporting part for an upper roof wall and with the roof frame by means of a holding device. In accordance with the preferred embodiment, the upper roof wall has a local extension in the vicinity of the supporting part which rests upon a bent portion of the supporting part, and the holding device is formed by a recess in a peripheral wall of the roof formed by the segment and by an element of the supporting part that projects into the recess.

11 Claims, 3 Drawing Figures

ROOF FOR VEHICLES, ESPECIALLY MOTOR VEHICLES, FOR AGRICULTURAL PURPOSES

BACKGROUND AND SUMMARY OF THE INVENTION

The invention relates to a roof for vehicles, especially motor vehicles, for agricultural purposes, the roof having the shape of a trough and being mounted on a roof frame.

In a known roof of the species cited hereinabove (French Pat. No. 2 201 667), the upper roof wall, running approximately horizontally, is supported on cross members by means of elastic elements, whereby a segment which circumferentially delimits the roof wall rests directly upon the frame parts of the vehicle. This design suffers from the disadvantage that this type of design and mounting not only causes permanent deformation of the roof wall but also makes it more difficult to mount the roof, especially when tolerances are unsatisfactory. Moreover, no precautions are taken to ensure that the segment is always aligned in proper position with the adjacent frame of the vehicle.

Thus, an object of the present invention is to provide a roof which can be mounted easily and is held firmly on the vehicle.

According to a preferred embodiment of the invention, this object is achieved by the roof being made of plastic and fastened removably to the vehicle, having a segment which rests upon the roof frame with a sealing element provided between them, said frame being provided with a supporting part for an upper roof wall, and by the segment cooperating with the roof frame by a holding device. It is advantageous in this connection for the roof wall to have a local expansion in the vicinity of the supporting part, the expansion resting upon a bend in the supporting part. The expansion is provided with a threaded insert. The mounting device is formed by a gutter and by an element projecting into the latter. The gutter is provided on the segment in the vicinity of a thickening. The element is formed by an angle mounted on the supporting part. Moreover, the part of the segment which covers the roof frame runs at a distance from one roof frame wall.

Special advantages achieved by the invention include the fact that the roof, which exhibits a certain degree of instability because of its shape and material, can be mounted easily and rests upon the roof frame without creating noise. During assembly, the mounting device ensures that it is always aligned in the proper position. Moreover, the mounting of the segment, which is provided with a thickening, provides an arrangement which is favorable from the strength standpoint.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
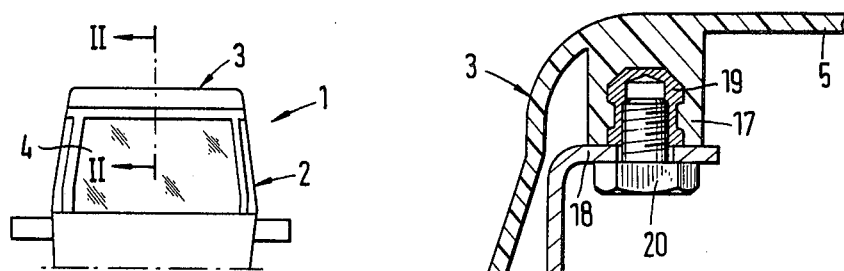
FIG. 1 is a rear view of a vehicle equipped with a roof according to the invention.
Figure 2:
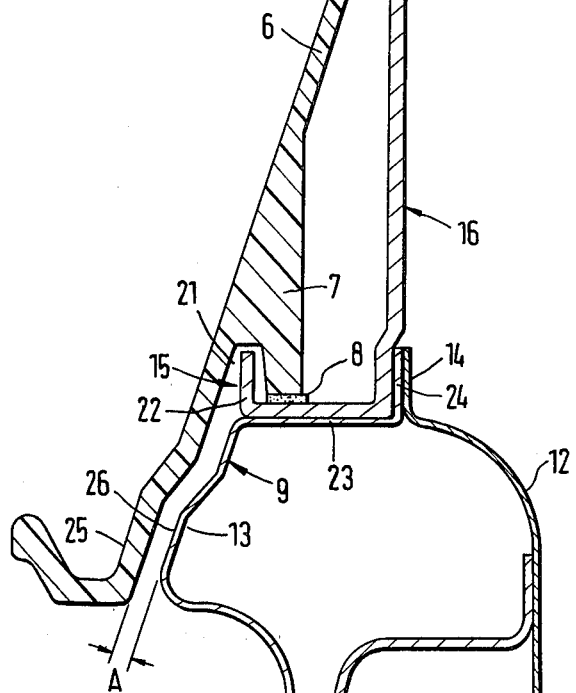
FIG. 2 is a cross section along Line II—II in FIG. 1 on an enlarged scale.

Vehicle 1, in the area shown, comprises a body 2 with a roof 3 and a rear window 4. Roof 3 is made of plastic and is formed by an upper wall 5, which runs approximately horizontally, and a segment 6 which delimits the latter circumferentially. The arrangement of segment 6 on roof wall 5 gives roof 3 the shape of an inverted trough.

Figure 3:
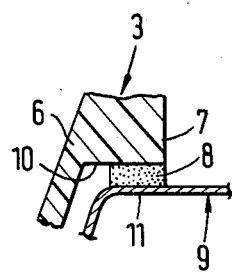
FIG. 3 is a partially cut-away view of FIG. 1.

Segment 6 has a thickened portion 7, located inside the roof, which rests upon a roof frame 9 (FIG. 3) with a sealing element 8 interposed therebetween. Thickened portion 7 and roof frame 9 have areas 10 and 11, respectively, which run horizontally. Roof frame 9 is formed by an inner part 12 and an outer part 13, which are fastened at respective flanges 14, 24.

A supporting part 16 is provided on roof frame 9, the part fitting against an extension 17 of roof wall 5 which prevents local collapse. Extension 17 rests upon an angle 18 of supporting part 16 and is provided with a threaded insert 19 to accept a bolt 20. The shape and thickness of extension 17 are determined by the anticipated stresses.

Supporting part 16 also forms part of a holding device 15 formed by a preferably local recess 21 in thickened portion 7 and an element 22 projecting into recess 21. Element 22 is made in the form of an angle and is connected integrally with supporting part 16 to facilitate manufacture, the part 16 being fastened to roof frame 9 at 23 and 24 by welding.

Segment 6 comprises a part 25 which covers roof frame 9 on its outside 26 and is constructed to serve as a rain gutter. A distance A is provided between part 25 and roof frame 9 in order to compensate for manufacturing and temperature tolerances.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Roof assembly for vehicles, especially motor vehicles for agricultural purposes, comprising an inverted trough-shaped roof, having an upper roof wall delimited by an upright roof segment, releasably secured on a vehicle, said upright roof segment having a thickened portion being supported on a roof frame with a sealing means interposed between the portion and roof frame, wherein a supporting part is provided which extends from the upper roof wall to the roof frame and wherein a holding device is provided between the thickened portion and the roof frame in a manner laterally aligning said roof.

2. Roof assembly according to claim 1, wherein the thickened portion extends inwardly from a vertically intermediate area of the upright roof segment toward the roof frame.

3. Roof assembly according to claim 1 or 2, wherein the supporting part is fixedly secured to the roof frame at a lower end thereof and is releasably secured to the underside of the upper roof wall at an upper end thereof, and the holding device is an element extending upwardly from said roof frame, at said lower end of the supporting part, into a recess in the thickened portion of the upright roof segment.

4. Roof assembly according to claim 3, wherein a lower portion of said roof segment lateral covers the roof frame and is spaced therefrom.

5. Roof assembly for vehicles according to claim 1, characterized by the fact that the upper roof wall has a local extension in the vicinity of said supporting part, said extension resting upon a bent portion of the supporting part.

6. Roof assembly according to claim 5, characterized by the fact that the local extension is provided with a threaded insert for receiving a connecting bolt joining said upper roof wall to said bent portion.

7. Roof assembly according to claims 1 or 5, characterized by the fact that the holding device is formed by a recess in a peripheral wall of the roof formed by said segment and by an element of the supporting part projecting into the recess.

8. Roof assembly according to claim 7, characterized by the fact that the recess is provided on the segment in the vicinity of the thickened portion thereof.

9. Roof assembly according to claim 7, characterized by the fact that the element is formed by an angular portion of the support part.

10. Roof assembly according to claim 1 or 2, characterized by the fact that part of the segment covers the roof frame and runs at a distance from a roof frame wall.

11. Roof assembly according to claim 10, wherein said part of the segment covering the roof frame is constructed to serve as a rain gutter.

* * * * *